United States Patent [19]

Bier

[11] 4,399,244
[45] Aug. 16, 1983

[54] GLASS FIBER REINFORCED POLYETHYLENE TEREPHTHALATE COMPOSITIONS HAVING IMPROVED HEAT DISTORTION TEMPERATURES

[75] Inventor: Peter Bier, New Martinsville, W. Va.

[73] Assignee: Bayer Aktiengesellschaft, Leverkusen, Fed. Rep. of Germany

[21] Appl. No.: 95,276

[22] Filed: Nov. 19, 1979

[51] Int. Cl.$^3$ .................. C08K 5/34; C08K 7/14; C08L 67/02
[52] U.S. Cl. .................................... 524/89; 524/605
[58] Field of Search ............ 260/40 R; 524/104, 105, 524/89, 605

[56] References Cited

U.S. PATENT DOCUMENTS

| | | | |
|---|---|---|---|
| 3,368,995 | 2/1968 | Furukawa et al. | 260/40 R |
| 3,516,957 | 6/1970 | Gray et al. | 260/22 |
| 3,624,024 | 11/1971 | Caldwell et al. | 260/40 R |
| 3,692,744 | 9/1972 | Rich et al. | 260/75 T |
| 3,814,725 | 6/1974 | Zimmerman et al. | 260/40 R |
| 3,868,388 | 2/1975 | Dotson et al. | 260/326 N |
| 3,873,567 | 3/1975 | Cyba | 260/326 C |
| 3,915,930 | 10/1975 | Dotson et al. | 260/45.8 N |
| 3,923,734 | 12/1975 | Dotson et al. | 260/45.75 B |
| 4,001,179 | 1/1977 | Richter et al. | 260/45.75 B |
| 4,003,862 | 1/1977 | Albright et al. | 260/2.5 AJ |
| 4,087,441 | 5/1978 | Lee | 260/326 N |
| 4,096,202 | 6/1978 | Farnham | 260/873 |
| 4,144,284 | 3/1979 | Semanaz et al. | 260/40 R |
| 4,212,791 | 7/1980 | Avery et al. | 260/40 |
| 4,223,125 | 9/1980 | Bier et al. | 528/305 |

FOREIGN PATENT DOCUMENTS

| | | |
|---|---|---|
| 50-7424745 | 9/1975 | Japan . |
| 1111012 | 4/1968 | United Kingdom . |
| 1287934 | 9/1972 | United Kingdom . |

*Primary Examiner*—Paul Lieberman
*Assistant Examiner*—Robert E. L. Sellers
*Attorney, Agent, or Firm*—Gene Harsh; Lawrence S. Pope

[57] ABSTRACT

This disclosure is concerned with glass reinforced polyethylene terephthalate compositions which have improved heat distortion temperatures when molded into cold molds due to the incorporation of an organic imide containing compound having a melting point in excess of 240° C. These compositions have enhanced crystallization velocities which allows them to be molded into colder molds with faster cycle times than is conventional for polyethylene terephthalate compositions and still obtain crystalline parts with optimum properties including heat distortion temperatures. Mold temperatures of less than 120° C. may be utilized without impairment of these properties.

6 Claims, No Drawings

GLASS FIBER REINFORCED POLYETHYLENE TEREPHTHALATE COMPOSITIONS HAVING IMPROVED HEAT DISTORTION TEMPERATURES

BACKGROUND OF THE INVENTION

Polyethylene terephthalate (PET) is particularly suitable for the manufacture of fibers, filaments and sheets. PET, however, is not generally suitable for injection molding because of the high molding temperatures (e.g. around 140° C.) and the relatively long molding times required. These severe processing conditions have generally prevented the widespread use of polyethylene terephthalate for injection molding despite the fact that products molded under these severe conditions exhibit high rigidity and high heat distortion temperatures. The high mold temperatures required are beyond the equipment capabilities of many mold shops which have only water heated molds. Such molds are normally capable of temperatures no higher than about 110° C. Thus, wide use of this polymer is restricted not only by the economics of its long processing cycle but also by the inability of many potential molders to process the resin.

It is an object of the present invention to provide polyethylene terephthalate compositions which can be molded at lower temperatures and more rapidly than has previously been possible. At the same time, it is an object of this invention to obtain compositions having heat distortion temperatures substantially the same as those obtained when molding under the above-noted severe conditions.

SUMMARY OF THE INVENTION

The present invention relates to novel thermoplastic compositions which are based on polyethylene terephthalates which can be molded at temperatures of less than about 120° C. and will exhibit heat distortion temperatures substantially the same as those obtained when molding at temperatures in the area of 140° C. The compositions of the instant invention also exhibit enhanced fire retardant properties. Finally, the present invention relates to an improved injection molding process using the compositions of the invention.

The present invention broadly comprises a thermoplastic composition comprising (a) from 20 to 92% by weight of and preferably from 45 to 75% by weight of a polyethylene terephthalate having an intrinsic viscosity of at least about 0.3 dl/g, preferably at least about 0.5 dl/g, measured as a 0.5% by weight solution in a 1:1 mixture of phenol and tetrachloroethane at 25° C., (b) from 5 to 60%, preferably from 20 to 40%, by weight of glass fibers, and (c) from 3 to 20%, preferably from 5 to 15%, by weight of an organic compound containing at least one imide group and having a melting point greater than 240° C. The instant invention also relates to a process for injection molding comprising (a) intimately blending the three components noted above, and (b) injection molding the resultant blend into a mold held at a temperature of no more than 120° C., preferably held at a temperature between about 80° and 110° C.

DETAILED DESCRIPTION OF THE INVENTION

The invention is directed broadly to an at least three-component composition, i.e. a polyalkylene terephthalate, glass fibers and the imide-group containing compound.

The dicarboxylic acid component of the polyethylene terephthalate (a) consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of brancing agent, based on the quantity of acid component.

Polyethylene terephthalates derived mainly from terephthalic acid and ethylene glycol are preferred and homoethylene terephthalate, i.e. a product produced substantially only from ethylene glycol and terephthalate acid or its esters, or its anhydride is most preferred.

The polyethylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g. those described by R. E. Wilfong in J. Polym. Sci. 54, 385 (1961). Some of these catalysts (A) are more powerful accelerators of the esterification reaction (a), others (B) for the polycondensation reaction (b), and still others (C) are fairly active for both (a) and (b).

The following are examples of catalysts (A) which are suitable for accelerating reaction (a):

1. Lithium, sodium, potassium, calcium, strontium and boron in the form of the metals or their oxides, hydrides, formates, acetates, alcoholates, or glycolates;
2. Calcium and strontium chlorides and bromides;
3. Tertiary amines;
4. Calcium and strontium malonates, adipates, benzoates, etc.;
5. Lithium salts of dithiocarbamic acids.

The following are examples of catalysts (B) suitable for the polycondensation reaction (b):

1. Molybdenum, germanium, lead, tin and antimony in the form of the metals or their oxides, hydrides, formates, alcoholates or glycolates;
2. Zinc and lead perborates and borates;
3. Zinc, manganese(II), cobalt, magnesium, chromium, iron and cadmium succinates, butyrates, adipates or enolates of a diketone;
4. Zinc chloride and bromide;
5. Lanthanum dioxide and titanate;
6. Neodymium chloride;
7. Mixed salts of antimony, e.g. potassium antimony tartrate, and salts of antimonic acids, such as potassium pyroantimonate.
8. Zinc or manganese salts of dithiocarbamic acids;
9. Cobalt naphthenate;
10. Titanium tetrafluoride or tetrachloride;
11. Alkyl ortho-titanates;
12. Titanium tetrachloride ether complexes;
13. Quaternary ammonium salts carrying a titanium hexaalkoxy group; titanium tetraalkoxides, alkali metal or alkaline earth metal compounds of aluminum, zirconium or titanium alkoxides;
14. Organic quaternary ammonium, sulphonium, phosphonium and oxonium hydroxides and salts;
15. Barium malonate, adipate, benzoate, etc.;
16. Lead, zinc, cadmium or manganese salts of the monoalkyl ester of a phenylene dicarboxylic acid;
17. Antimony catechuic complexes with an amino alcohol or with an amine and an alcohol;
18. Uranium trioxide, tetrahalide, nitrate, sulphate or acetate.

The following are examples of catalysts (C) which are suitable for accelerating both steps (a) and (b) of the reaction:

1. Barium, magnesium, zinc, cadmium, aluminum, manganese and cobalt as the metals or their oxides, hydrides, formates, alcoholates, glycolates or preferably, as acetates;
2. Aluminum chloride and bromide;
3. Zinc, manganese(II), cobalt, magnesium, chromium, iron and cadmium succinates, butyrates, adipates, or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g. zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 carbon atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product (cf. "Polyesterfasern" by H. Ludewig, 2nd Edition, publishers Akademie-Verlag, Berlin 1974). The following are examples of such inhibitors: phosphoric acid, phosphorous acid and aliphatic, aromatic and araliphatic esters thereof, e.g. the alkyl esters having from 6 to 18 carbon atoms in the alcohol component, phenyl esters in which the phenyl groups can carry 1 to 3 substituents having 6 to 18 carbon atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyethylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The second component of the composition of the invention is glass fibers. It has been found that substantially any of the types of glass fibers generally known and/or used in the art are useful in the present invention. Typical types are those described in British Pat. No. 1,111,012, U.S. Pat. No. 3,368,995 and German Auslegeschrift No. 2,042,447. The usefulness of any particular type of glass fiber does not depend on its average length. Thus, the average length of useful fibers covers a wide range. The presently preferred glass fibers have an average length of about 200 microns.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments can be in the range from about 0.003 to 0.018 mm, but this is not critical for the present invention.

The length of the glass filaments and whether they have been spun to give fibers and the fibers in turn have been bundled to give yarns, ropes or hanks or woven to give mats and the like is not critical for the invention. However, it is convenient to use fiber-like glass in the form of glass fiber staple about 3 to about 25 mm in length and preferably less than 6 mm in length for reinforcing the polyesters according to the invention. On the other hand, even shorter pieces are found in moldings produced from reinforced polyesters according to the invention since considerable comminution takes place during mixing. It is, however, desirable that the lengths of the filaments are between about $1.25 \times 10^{-3}$ and about 3 mm. It is particularly preferred that the fiber length in pellets suitable for molding and in molded parts be less than 0.4 mm.

The third component of the composition is an organic compound containing at least one imide group and having a melting point greater than 240° C. Useful families of imide group containing compounds include N,N'-arylene-diphthalimides wherein the arylene group includes phenylene, diphenyl, naphthyl and sulfonate bridged bisphenyls, tetrabrominated phthalimides, N,N'-bis(dibromo cyclohexane dicarboximides) with various bridging groups, and N,N'-alkylenebis (tetrahalophthalimides).

Preferred imide group containing compounds are those corresponding to the following formula:

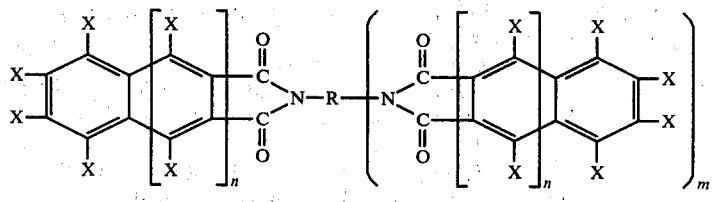

wherein both n and m may be 1 or 0,

X may be halogen, particularly chlorine or bromine, or hydrogen, but is halogen when R is alkyl, and R is a $C_1$ to $C_6$ alkyl group, a single bond, a phenylene group, a tolulene group, a cyclohexylene group, a bis phenyl methane group, a bis cyclohexyl methane group, or a naphthylene group.

The N,N'-alkylenebis(tetrahalophthalimides) suitable in the present invention and a process for their production are described in U.S. Pat. No. 4,087,441, incorporated herein by reference. The preferred N,N'-alkylenebis(tetrahalophthalimides) are represented by the formula

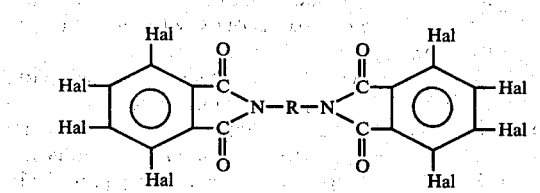

wherein

R represents a $C_1$-$C_6$ alkyl group, preferably a $C_2$-$C_6$ alkyl group, and most preferably an ethyl group, and Hal which may be the same or different, represents a halogen atom, preferably Br or Cl, and most preferably Br.

The most particularly preferred N,N'-alkylenebis(tetrahalophthalimide) is N,N'-ethylenebis(tetrabromophthalimide) (R is an ethyl group and Hal is a Br atom). The utility of these types of imide group containing components is known to enhance fire retardant properties in polyethylene terephthalate (see e.g. Japanese patent application 75-119041) and other polyesters (see e.g., U.S. Pat. Nos. 3,624,024 and 3,873,567 and British Pat. No. 1,287,934).

Other suitable imide group containing compounds include 1,4,5,6 tetrabromo-2,3-phthaloimide; N methylol tetrabromo phthalimide; N,N-bis-(1,4,5,6-tetrabromo-2,3-phthaloimide); N,N'-p-phenylene-diphthalimide; N,N'-di-phthalimidodiphenyl; bis-(N phenyl-phthalimido) sulphone; N,N'-p-phenylene-di-tetrachlorophthalimide; 4,4'-di-tetrachlorophthalimido diphenyl; N-tetrachlorophthalimido)-tetrachlorophthalimide, N,N'-p-phenylene-di-tetrabromophthalimide; N,N'-di-tetrabromophthalimido diphenyl; N-(tetrabromophthalimido)-tetrabromophthalimide; N,N'-bis-(5,6-dibromocyclohexane-2,3-dicarboximide); and N,N'-(1,2 ethane)-bis-(5,6 dibromocyclohexane-2,3-dicarboximide). Further suitable imide containing compounds are disclosed in U.S. Pat. Nos. 3,868,388; 3,873,567; 3,915,930; 3,923,734; 4,001,179 and 4,003,862 and in allowed U.S. patent application Ser. No. 868,145 filed January 9, 1978 all incorporated herein by reference. Further suitable imides are also disclosed in British Pat. No. 1,287,934.

The amounts of components present may vary over a wide range. Generally, the compositions should contain from 20 to 92% by weight, and preferably 45 to 75% by weight of polyethylene terephthalate, from 5 to 60%, and preferably 20 to 40% by weight of glass fibers, and from 3 to 20%, and preferably 5 to 15% by weight of the imide group containing compound.

It is preferred that the composition have less than 0.5 wt. %, more preferably less than 0.1 wt. % of any additive other than the imide which has a melting point in excess of 240° C. Included among such additives are carbon powders, the oxides, sulfates, phosphates, silicates, oxalates, stearates, benzoates, salicylates and tartrates of metals of Group II of the Periodic Table and neutral clays. Particularly disfavored additives include graphite, talc, calcium benzoate, zincoxide, calcium sulfate, calcium oxalate, carbon black, titanium oxide. The nucleating agents disclosed in U.S. Pat. No. 3,368,995 incorporated herein by reference are unnecessary to the compositions of and used in the process of the present invention and may be excluded therefrom.

Injection molding conditions for polyethylene terephthalates are well known to those skilled in the art and are taught in U.S. Pat. No. 3,516,957, incorporated herein by reference, and Injection Molding Theory and Practice, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear rates of between about 100 and 10,000 reciprocal seconds. These conditions may also include vacuums of down to 20 inches of Hg. Of course, these conditions also include mold temperatures of between about 100° and 200° C. but as will become apparent, the composition of the present invention may be molded at lower temperatures and shorter mold times.

The mixtures of polyethylene terephthalate, glass fibers and imide group containing compound can be obtained in usual commercial mixing apparatus such as kneaders and one-shaft or two-shaft screw extruders. The solidified melt of the mixtures can be granulated for further processing, and this can be followed by a post-condensation in the solid phase.

The compositions of the present invention may be molded at temperatures of below about 120° C. and still yield high heat distortion temperatures and the superior mechanical and chemical properties which make these resins attractive for injection molded articles. When used in compositions of the present invention these polymers may be molded under much less favorable conditions (colder molds, e.g. below about 120° C., and shorter residence time in the mold, e.g. less than about 60 seconds) and still display heat distortion temperatures substantially similar to those obtainable under optimum conditions (i.e. high mold temperature and long residence time). Thus, the present invention includes a process for molding resins based primarily, and preferably solely, upon terephthalic acid and ethylene glycol at mold temperatures of less than about 120° C. while attaining heat distortion temperatures similar to those obtainable under optimum injection molding conditions with the polyester and glass fiber alone.

The process comprises intimately blending the terephthalic acid/ethylene glycol based resin, glass fibers, and imide group containing compound and injection molding the composition so prepared into molds held at temperatures less than about 120° C., preferably less than about 110° C. The polyester consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.3 dl/g, preferably 0.5 dl/g (measured as a 0.5% strength by weight solution in a phenol/tetrachloroethane mixture in a weight ratio of 1:1 at 25° C.).

In a preferred embodiment of the present invention, the residence time in the mold is significantly less than that required for the unmodified polyester (e.g. pure resin) in making the same part. For small, fairly simple parts this may be less than about 30 seconds, more preferably less than about 20 seconds and most preferably less than 10 seconds as compared to 40 seconds or more for unmodified resin. Of course, significant reductions in the mold residence time of resins modified with conventional additives such as micro talc nucleating agent are also obtained by further modifying these resins with appropriate amounts of the imide group containing compound of the present invention.

The usual quantities of stabilizers, preferably from 0.01 to 0.5% by weight, based on the weight of the polyethylene terephthalates can be added to protect against thermooxidative degradation. Suitable stabilizers include phenols and phenol derivatives, particularly sterically hindered phenols which have alkyl substituents with 1 to 6 carbon atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5-di-tert.-butyl-4-hydroxybenzyl)-benzene; 4,4'-butylidene-bis-(6-tert.-butyl-m-cresol); 3,5-di-tert.-butyl-4-hydroxybenzyl-phosphonic acid diethyl ester; N,N'-bis-(β-naphthyl)-p-phenylenediamine; N,N'-bis-(1-methylheptyl)-p-phenylenediamine; phenyl-β-naphthylamine; 4,4'-bis-(α,α-dimethylbenzyl)-diphenylamine; 1,3,5-tris-(3,5-di-tert.-butyl-4-hydroxy-hydrocinnamoyl)hexahydro-s-triazine; hydroquinone; p-benzoquinone, toluhydroquinone; p-tert.-butyl-pyrocatechol; chloranil; naphthoquinone; copper naphthenate; copper octoate; CU(I)Cl/triphenyl-phosphate; CU(I)Cl/trimethylphosphite; CU(I)Cl/trischloroethylphosphite; CU(I)Cl/tripropylphosphite; and p-nitrosodimethylaniline. Also suitable as stabilizing agents against molecular weight degradation from hydrolysis are carbodiimides.

Inorganic or organic pigments, dyes, lubricants and mold release agents such as zinc stearate, montan wax, UV absorbers and the like can also be added in the usual quantities.

Additional flame-retardant materials can be added in amounts of from 2 to 20% by weight, based on the composition. Such known flame-retarding agents include halogen-containing compounds, elementary phosphorus or phosphorus compounds, phosphorus-nitrogen compounds, antimony trioxide or mixtures thereof. Specific materials include antimony, trioxide, decabromobiphenyl ether and tetrabromobisphenol-A-polycarbonate.

The crystallization velocity of the thermoplastic polyester molding compositions can be increased by adding nucleating agents in quantities of from 0.01 to 1% by weight, based on the quantity of polyester. Compounds of this kind are known in the art (cf. Kunststoff-Handbuch, Volume VIII, "Polyester", Carl Hanser Verlag, Munich, 1973, page 701).

The thermoplastic compositions of this invention are suitable for the manufacture of all kinds of molded articles by injection molding and also for the production of films and fibers.

In all of the examples which follow the compositions were prepared for extrusion by tumbling polyethylene terephthalate pellets with all the indicated additives, all of which were in powder form, for two and one half minutes and then, when indicated, the composition was tumbled an additional twenty seconds with the chopped strand glass fibers.

These tumble blended compositions were extruded to pellets in a Waldron Hartig 1½"0 single screw extruder with a 24:1 L/D barrel, non-vented and fitted with a 2.75:1 CR screw (feed, 6 flights; meter, 12 flights at 0.115 inches) containing 4 rows of mixing pins 5.25 inches apart and each pin 0.25 inches apart. A 40, 60, 20 mesh screen assembly was used except when fiberglass or $Sb_2O_3$ were part of the composition. The temperature profile was 250° C. at the rear, middle, front and die. The melt temperature was 255°–260° C., the die pressure was 0 psi and the screw was operated at 50 rpm.

Test specimens were molded from the extruded pellets using a Newbury Industries 3 oz. capacity ¾" reciprocal screw injection machine, Model H3-75RS. The thermal profile was 250° C. at the rear, front and nozzle. No primary injection was used, the secondary injection time was 10 seconds and the cure time was 10 seconds for a cycle time of twenty seconds. The primary pressure was 560 psi, the secondary pressure was 0 psi and the back pressure was 50 psi. The ram speed was 70% of maximum.

The mold was held at a temperature of 100° C. and consisted of a family of cavities providing:

2×3 inch color chip stepped to 0.1 and 0.125 inch thickness

½×5×¼" bar

2½×2½×⅛" bars

½×7×0.275" to 0.060 tapered bar

½×5×1/16" bar

All cavities were chrome plated DME No. 3 steel, and were equipped with runner shut offs.

The materials and amounts of materials (in parts by weight) were as indicated in Table I. The heat distortion temperature (HDT, °C.) noted in Table I was obtained following ASTM D-648. This test method consists in holding the specimen at two support points separated by five inches. The temperature is then raised at the rate of 2° C. per minute with application of a load of 264 psi at the midpoint. The temperature when the deformation of the specimen has reached 1/100 inch is the heat distortion temperature.

Melting Point ~195° C.
HP, $C_{12}P$ and EP are of the general formula

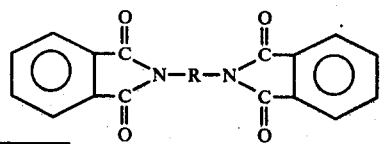

TABLE I

|  | Example #1 | Example #2 | Comparison Examples |  |  |  |  |
|---|---|---|---|---|---|---|---|
|  |  |  | 1 | 2 | 3 | 4 | 5 |
| VFR 5041 | 6.3 | — | 6.3 | 6.3 | 6.3 | 6.3 | 6.3 | 35 |
| TENITE 7741 | — | 6.3 | — | — | — | — | — | — |
| K419AA | 3 | 3 | 3 | 3 | 3 | 3 | 3 | 15 |
| BT-93 | 0.7 | 0.7 | — | — | — | — | — | — |
| EP | — | — | — | 0.7 | — | — | — | — |
| HP | — | — | — | — | 0.7 | — | — | — |
| $C_{12}P$ | — | — | — | — | — | 0.7 | — | — |
| EHP | — | — | — | — | — | — | 0.7 | — |
| MP | — | — | 0.7 | — | — | — | — | — |
| HDT | 198° C. | 197° C. | 72° C. | 66° C. | 132° C. | 141° C. | 92° C. | 158° C. |

VFR 5041: A polyethylene terephthalate available from Goodyear, having an intrinsic viscosity of 1.04 dl/g measured as a 0.5% by weight solution in a 1:1 mixture of phenol and tetrachloroethane at 25° C.

TENITE 7741: A polyethylene terephthalate available from Eastman Kodak, having an intrinsic viscosity of 0.54 dl/g measured as a 0.5% by weight solution in a 1:1 mixture of phenol and tetrachloroethane at 25° C.

K419AA: Chopped strand glass fiber available from Owens Corning Fiberglas.

BT-93:

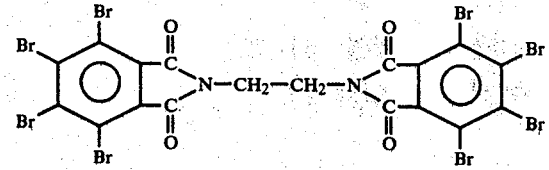

Melting point ~450° C.
MP: N-methyl tetrachlorophthalimide

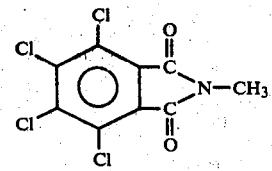

For HP, $R=C_6$ Melting point ~175° C.
$C_{12}P$, $R=C_{12}$ Melting point ~115° C.
EP, $R=C_2$ Melting point ~234° C.

EHP:

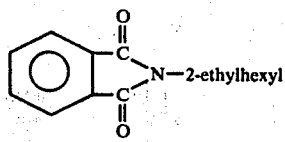

Melting point ~28° C.

All compositions of Table I contained a nucleating amount of micro talc and a low level (less than 0.3 wt.%) of a stabilizer system not believed to affect the crystallization behavior or heat distortion temperature of the compositions.

EXAMPLES 3-6 AND COMPARISON EXAMPLES 6-16

The materials and amounts of materials (in parts by weight) were as indicated in Table II. The results of all tests conducted were as indicated.

TABLE II

|  | COMPARISON EXAMPLES | | | EXAMPLES | | | COMPARISON EXAMPLES | | | EXAMPLE | COMPARISON EXAMPLES | | | | |
|---|---|---|---|---|---|---|---|---|---|---|---|---|---|---|---|
|  | 6 | 7 | 8 | 3 | 4 | 5 | $9^1$ | $10^2$ | $11^3$ | 6 | 12 | 13 | 14 | $15^4$ | $16^5$ |
| TENITE 8500 | 5.35 | 5.05 | 4.75 | 5.04 | 4.76 | 4.48 | 5.05 | 5.05 | 5.05 | 4.76 | 7.2 | 7.0 | 6.8 | 7.0 | 7.0 |
| $Sb_2O_3$ | 0.35 | 0.35 | 0.35 | 0.35 | 0.35 | 0.35 | 0.35 | 0.35 | 0.35 | 0.35 | 0.5 | 0.5 | 0.5 | 0.5 | 0.5 |
| K419AA | 3.0 | 3.0 | 3.0 | 3.0 | 3.0 | 3.0 | 3.0 | 3.0 | 3.0 | 3.0 | — | — | — | — | — |
| KM330 | 0.6 | 0.9 | 1.2 | 0.56 | 0.84 | 1.12 | 0.9 | 0.9 | 0.9 | 0.84 | 0.8 | 1.0 | 1.2 | 1.0 | 1.0 |
| DBDPE | 0.7 | 0.7 | 0.7 | — | — | — | 0.7 | 0.7 | 0.7 | — | — | — | — | — | — |
| BT-93 | — | — | — | 1.05 | 1.05 | 1.05 | — | — | — | 1.05 | 1.5 | 1.5 | 1.5 | 1.5 | 1.5 |
| IZOD, J/M |  |  |  |  |  |  |  |  |  |  |  |  |  |  |  |
| ⅛" Notched | 62 | 76 | 69 | 65 | 63 | 65 | 69 | 67 | 69 | 65 | 46 | 49 | 51 | 52 | 44 |
| Unnotched | 625 | 561 | 603 | 483 | 571 | 495 | 651 | 614 | 582 | 561 | 223 | 326 | 293 | 251 | 162 |
| Flex Mod GPa | 10.2 | 9.5 | 9.3 | 9.5 | 10.6 | 10.4 | 9.0 | 10.0 | 10.0 | 11.4 | — | — | — | — | — |
| Flex Strength MPa | 187 | 174 | 167 | 169 | 173 | 161 | 164 | 175 | 171 | 182 | 67 | 61 | 62 | 61 | 69 |
| Tensile Strength MPa | 138 | 128 | 119 | 123 | 120 | 115 | 120 | 123 | 124 | 124 | 47 | 48 | 47 | 47 | 51 |

TABLE II-continued

|  | COMPARISON EXAMPLES | | | EXAMPLES | | | COMPARISON EXAMPLES | | | EXAMPLE | COMPARISON EXAMPLES | | | | |
| --- | --- | --- | --- | --- | --- | --- | --- | --- | --- | --- | --- | --- | --- | --- | --- |
|  | 6 | 7 | 8 | 3 | 4 | 5 | 9[1] | 10[2] | 11[3] | 6 | 12 | 13 | 14 | 15[4] | 16[5] |
| UL-94 1/16" | V-O | V-O | V-O | V-O | V-O | V-O | V-O | V-O | V-O | V-O | V-O | V-O | V-O | V-O | V-O |
| HDT, °C. | 106 | 117 | 120 | 204 | 218 | 200 | 166 | 180 | 181 | 224 | 79 | 77 | 76 | 76 | 79 |

[1] Contained 0.02 parts E-Wax
[2] Contained 0.06 parts E-Wax
[3] Contained 0.01 parts ZS
[4] Contained 0.024 parts E-Wax
[5] Contained 0.016 parts ZS TENITE 8500: A polyethylene terephthalate available from Eastman Kodak, having an intrinsic viscosity of 0.54 dl/g measured as a 0.5%, by weight, solution in a 1:1 mixture of phenol and tetrachloroethane at 25° C. and containing 0.2% by weight of $TiO_2$.

$Sb_2O_3$: Antimony trioxide.

DBDPE: Decabromodiphenyl ether.

ZS: Zinc stearate.

TBBP-PC: Tetrabromo bisphenol oligocarbonate made from the phosgenation of 2,2-bis-(3,5-dibromo-4-hydroxyphenyl) propane to a polymerization degree of about 12 with phenol chain termination.

E-WAX: Diester of ethylene glycol and monocarboxylic alkyl acids of 25 to 32 carbon atoms obtained by the esterification of crude montan waxes and commercially available from American Hoechst Corporation.

KM330: A multiphase composite interpolymer available from Rohm and Haas and corresponding to the composition described in Example 26 of U.S. Pat. No. 4,096,202, based on n-butylacrylate, 1,3-butylene diacrylate, diallylmaleate and methyl methacrylate.

All compositions of Table II had a low level (less than 0.3 wt.%) of a stabilizer system not believed to affect the crystallization behavior or heat distortion temperature of the compositions. Comparison Examples 15 and 16 contained a nucleating amount of micro talc.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic composition comprising:
   (a) from 20 to 92% by weight of a polyethylene terephthalate having an intrinsic viscosity of at least 0.3 dl/g measured as a 0.5% by weight solution in a 1:1 mixture of phenol and tetrachloroethane at 25° C.,
   (b) from 5 to 60% by weight of glass fibers, and
   (c) from 3 to 20% by weight of an organic compound containing at least one imide group and having a melting point greater than 240° C.

2. The composition of claim 1, wherein the organic imide containing compound is an N,N'-alkylene bis-(tetrahalophthalimide).

3. The composition of claim 2, wherein
   (a) the polyethylene terephthalate has an intrinsic viscosity of at least 0.5 dl/g,
   (b) the glass fibers are present in 20 to 40% by weight, and
   (c) the imide containing compound is present in 5 to 15% by weight.

4. A thermoplastic molding composition comprising:
   (a) from about 20 to 92% by weight of polyethylene terephthalate having an intrinsic viscosity of at least 0.3 dl/g measured as a 0.5% by weight solution in a 1:1 mixture of phenol and tetrachloroethane at 25° C.,
   (b) from 5 to 60% by weight of glass fibers, and
   (c) from 3 to 20% by weight of an organic compound containing at least one phthalimide group and having a melting point greater than 240° C.

5. The composition of claim 4, wherein (a) polyethylene terephthalate, has an intrinsic viscosity of at least 0.5 dl/g, (b) glass fibers are present at 20–40% by weight, and (c) the phthalimide-containing compound is present in 5 to 15% by weight.

6. The composition of claim 1, wherein the phthalimide-containing compound is an N,N'-alkylene bis-(tetrahalophthalimide).

* * * * *